United States Patent [19]

Fujii

[11] 4,446,699
[45] May 8, 1984

[54] BRAKE BOOSTER FOR VEHICLES
[75] Inventor: Takashi Fujii, Toyota, Japan
[73] Assignee: Aisin Seiki Kabushiki Kaisha, Aichi, Japan
[21] Appl. No.: 231,156
[22] Filed: Feb. 3, 1981
[30] Foreign Application Priority Data Feb. 8, 1980 [JP] Japan .................................. 55-15190

[51] Int. Cl.³ .......................... F15B 9/10; B60T 13/00
[52] U.S. Cl. .................................. 60/547.1; 91/369 A
[58] Field of Search ............. 91/369 A, 369 B, 369 R, 91/376 R; 92/98 D, 98 R; 60/547 R, 554

[56] References Cited
FOREIGN PATENT DOCUMENTS

| 2922299 | 12/1979 | Fed. Rep. of Germany | 91/369 A |
| 2037918 | 7/1980 | United Kingdom | 91/369 A |
| 2040376 | 8/1980 | United Kingdom | 91/369 A |
| 2053395 | 2/1981 | United Kingdom | 91/369 A |
| 2066395 | 6/1981 | United Kingdom | 91/369 A |
| 2076094 | 11/1981 | United Kingdom | 91/369 A |

Primary Examiner—Paul E. Maslousky
Attorney, Agent, or Firm—Oblon, Fisher, Spivak, McClelland & Maier

[57] ABSTRACT

A brake booster for vehicles having a vehicle body with a brake pedal, including a tubular housing forming a seat portion having an inner wall, a brake master cylinder coaxially adjacent to an output side of said tubular housing and having a piston and a cylinder body, a cylinder integrally formed with said cylinder body of said brake master cylinder and extending to the inner wall of the seat portion within the tubular housing for attaching the tubular housing to the vehicle body, a flange member positioned adjacent said inner wall of said seat portion and formed on an end portion of an outer circumference portion of said cylinder, a first movable member axially dividing a space formed on an outer circumference portion of the cylinder by the tubular housing and the cylinder and movable to the output side due to a pressure difference generated therebetween both sides, a second movable member slidably inserted into the cylinder and integrally movable with the first movable member and including an end portion outwardly projecting from the tubular housing, a valve mechanism disposed within said movable member and actuatable by the brake pedal and regulating the pressure difference, an output member operatably connecting the first and second movable members and the piston of the brake master cylinder and an attaching mechanism for attaching the brake booster to the vehicle body mounted on the flange.

7 Claims, 2 Drawing Figures

BRAKE BOOSTER FOR VEHICLES

BACKGROUND OF THE INVENTION

1. Field of the Invention

The present invention relates to a brake booster for vehicles, and more particularly to a brake booster for vehicles adapted to lighten the weight of the vehicles.

2. Description of the Prior Art

It is important in the industry to lighten the weight of vehicle parts from the point of view of the reduction of fuel consumption. In order to lighten the weight of a brake booster, for example, it has been attempted to form the housing of the brake booster of a light material such as plastic. However, in such conventional construction in which the brake master cylinder actuated by the brake booster is connected to a housing of the brake booster and is supported thereby and the housing is fixed to a vehicle body, a reaction force due to actuation of the brake master cylinder is transmitted to the vehicle body through the housing. Accordingly, a fair degree of stiffness is required for the housing (and the stroke of the brake pedal is subject to increase due to the lack of stiffness). As a result, the housing made of plastics necessarily becomes thick and accordingly is not expected to be light in weight.

SUMMARY OF THE INVENTION

An object of the present invention is to provide an improved brake booster for vehicles which obviates the aforementioned drawbacks of the above described brake booster.

A further object of the present invention is to provide an improved brake booster which transmits a reaction force by actuation of a brake master cylinder to a vehicle body but not through the housing.

A still further object of this invention is to provide an improved brake booster for vehicles which is relatively simple and includes a minimal number of parts.

BRIEF DESCRIPTION OF THE DRAWINGS

Various other features, objects and attendant advantages of the present invention will become self-evident when considered in connection with the accompanying drawings wherein.

DETAILED DESCRIPTION OF THE PREFERRED EMBODIMENTS

Figure 1:
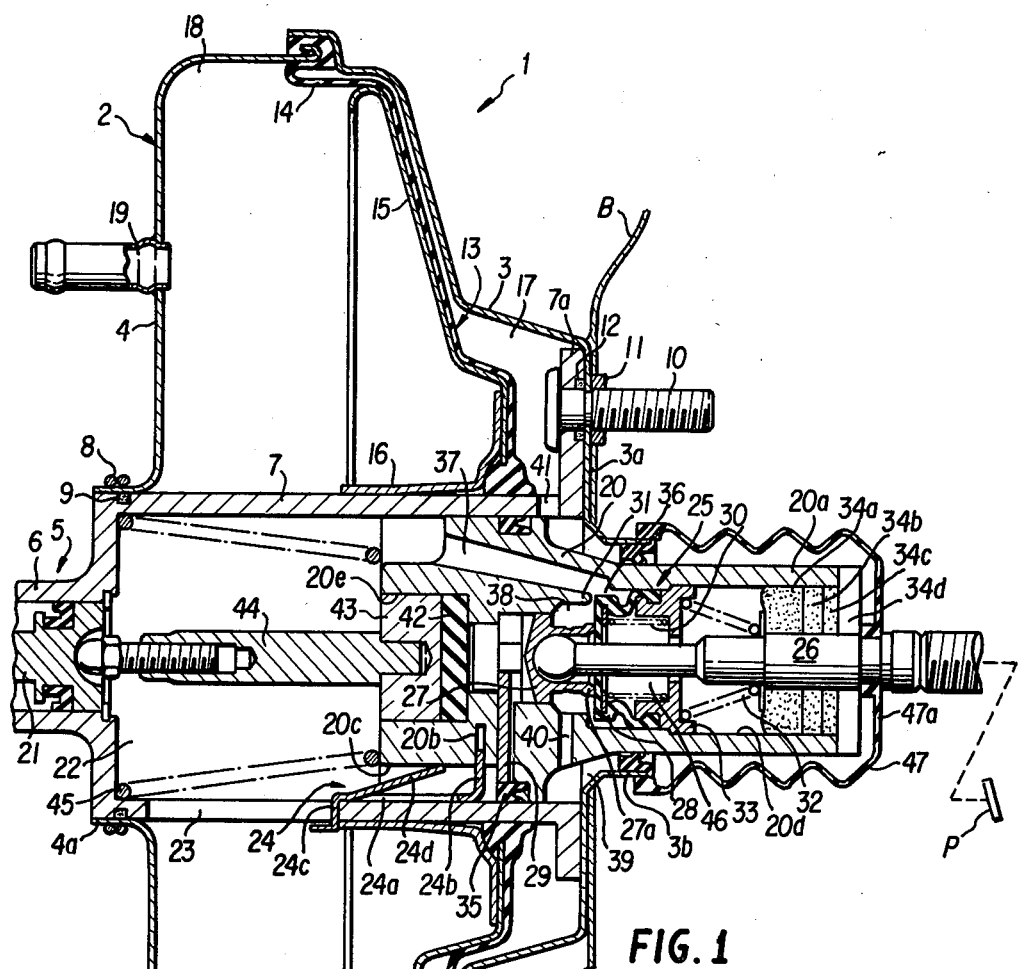
FIG. 1 is a longitudinal sectional view which shows a preferred embodiment of a brake booster for vehicles according to the present invention.
Figure 2:
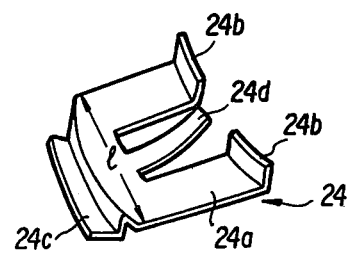
FIG. 2 shows a connecting member used in the embodiment illustrated in FIG. 1.

Referring now to FIGS. 1 and 2, reference numeral 1 denotes a brake booster. A housing 2 of brake booster 1 includes a cup-shaped first portion 3 and a cup-shaped second portion 4 opposed thereto. A cylinder 7 located within the housing is integrally formed on a cylinder body 6 of a brake master cylinder 5 which is coaxially adjacent to an output side of the brake booster 1.

A short sleeve portion 4a is formed on a central portion of the second portion 4 of the housing 2 for fixedly inserting the cylinder 7 thereinto. Sleeve portion 4d and cylinder 7 are sealingly secured by a tightening member 8 mounted on an outer circumference of sleeve portion 4a and a seal ring 9 attached to an outer circumference of the cylinder 7. The right end portion of cylinder 7 is contacted with an inner wall of a seat portion 3a formed on first portion 3 of housing 2 for attachment to the vehicle body B. A flange 7a is formed on an outer circumference of an end of cylinder 7 and is adjacent to the inner wall of seat portion 3a. Reference numeral 10 denotes a plurality of bolts for attachment which penetrate flange 7a and first portion 3 of housing 2.

Brake booster 1 and brake master cylinder 5 are attached to the vehicle body by the plurality of bolts 10. A nut 11 screwed with the bolts 10 integrates the first portion 3 of the housing 2 and the flange 7a and prevents the bolts 10 from being displaced. A seal ring 12 attached to flange 7a provides a seal between flange 7a, first portion 3 of housing 2 and bolts 10.

A space formed on the outer circumference of cylinder 7 by housing 2 and cylinder 7 is axially divided into two portions by a first movable member 13. First movable member 13 includes diaphragm 14 made of rubber, a shape-maintaining member 15, and a slide-guiding member 16. An outer circumferential edge Portion of diaphragm 14 is air-tightly sandwiched and fixed at the connection portion between the first and second portions 3 and 4 of housing 2 and an inner circumferential edge thereof is air-tightly and slidably contacted.

The slide-guiding member 16 is integrally connected to shape-maintaining member 15 and is slidably provided on the outer circumference of cylinder 7. Two chambers 17 and 18 are provided, which are divided by first movable member 13, and chamber 18 of an output side communicates with an intake manifold of an engine (not shown) via a port 19 provided on second portion 4 of housing 2.

A second movable member 20 slidable within cylinder 7 air-tightly and slidably passes a sleeve portion 3b of first portion 3 of housing 2 and is provided with a small diameter portion 20a outwardly projected from housing 2. A chamber 22 between the second movable member 20 and a piston 21 of the brake master cylinder 5 is communicated with chamber 18 by a plurality of openings 23 provided on cylinder 7. Openings 23 are provided the same distance in the inner circumferential direction of cylinder 7.

The first and second movable members 13 and 20 are connected to each other so as to integrally move by a plurality of connecting members 24 through openings 23. Connecting members 24 are provided with flange portions 24b, 24c at both ends of a base portion 24a thereof which slides along the inner circumference of the cylinder 7. Flange portion 24b is inserted into a recess 20b of second movable member 20 and flange portion 24c penetrates the openings 23 and contacts with an end face portion 16a of slide-guiding member 16 of first movable member 13.

Connecting members 24 are inserted into cylinder 7 together with second movable member 20, and recess 20c of second movable member 20 permits connecting member 24 to radially and inwardly move more than the length of flange portion 24c. A plate spring portion 24d of connecting members 24 prevent the same from becoming radially loosened. The width 1 of each connecting member 4 is much more than that of each corresponding opening 23, thereby preventing each connecting member 4 from being displaced. A valve mechanism 25 is disposed in a bore 20d of second movable member 20 for regulating the vacuum within chamber 17 by actuation of a brake pedal (not shown).

Valve mechanism 25 includes an air valve 27 connected to the brake pedal P through a push rod 26 and a control valve 28 according to movement of air valve 27. Air valve 27 is connected by a key 29 so as to slide a certain amount to second movable member 20 and one end portion 27a thereof is engaged with control valve 28.

Control valve 28 is urged by a spring 30 into the direction of a valve seat mounted on second movable member 20. A spring 32 urges a retainer 33 in the leftward direction of FIG. 1 and pushes rod 26 into the side of the brake pedal. Therefore, a stepped portion of retainer 33 is engaged with a stepped portion of small diameter portion 20a and valve mechanism 25 is maintained at the operational state of FIG. 1 upon discontinuation of operation of the brake pedal by spring 32. Reference numerals 34a, 34b, 34c, 34d indicate air filters.

Key 29 is prevented from being displaced by a seal member 35. Second movable member 20 is provided with a passage 37 for communicating a chamber 36 of the outer circumference of control valve 28 with chamber 22 and a passage 40 for communicating a chamber 38 of the outer circumference of one end portion of air valve 27 with chamber 39. Chamber 39 communicates with chamber 17 by a passage 41 provided on cylinder 7.

A reacting circular plate 42 made of rubber and a plug 43 are provided within a bore 20e of second movable member 20. Plug 43 is slidable within bore 20e and is integrally connected to an output rod 44 for pushing piston 21 of brake master cylinder 5.

The operation according to the invention is as follows:

FIG. 1 shows a state of discontinuance of operation of the brake pedal, and the vacuum within chamber 18 is transmitted to chamber 17 via chamber 22, passage 37, chamber 36, the clearance between control valve 28 and valve seat 31, chamber 33, passage 40, chamber 39, and passage 41. Accordingly, first and second movable members 13 and 20 are maintained at the return position of FIG. 1 by a return spring 45.

When the brake pedal is depressed, air valve 27 is moved leftwardly by push rod 26 in FIG. 1. Control valve 28 is thereby contacted with valve seat 31 and the transmission of vacuum from chamber 36 to chamber 38 is discontinued. Then, one end 27a of air valve 27 is released from control valve 28 and the inner space, portion 46 of control valve 28 and chamber 38 are intercommunicated. Since atmosphere is supplied to inner space 46 via a hole 47a of a boot 47 and air filters 34a, b, c, d, atmospheric pressure is communicated to chamber 17 and the pressure within chamber 17 becomes larger than that of chamber 18. The leftward operating force in FIG. 1 is transmitted to first movable member 13 by the pressure difference between chambers 17 and 18 and is transmitted to piston 21 of brake master cylinder 5 via connecting member 24, second movable member 20, reacting circular plate 42, plug 43, and output rod 44, and these members are moved leftwardly in FIG. 1.

Upon the above-mentioned operation, the actuating reaction of brake master cylinder 5 is transmitted from cylinder body 6 to the vehicle body via cylinder 7 and bolt 10, and, correspondingly, not via housing 2 of brake booster 1. Accordingly, housing 2 has a stiffness characteristic which is enough to not be transformed by the vacuum acting on chambers 17 and 18, and the thickness required for housing 2 is substantially decreased in comparison with the conventional apparatus, the weight therefore being appreciably decreased. The weight reduction of housing 2 is not directly considered as a whole weight reduction for the existence of cylinder 7 which does not exist in the conventional apparatus. However, in the case in which housing 2 is made of iron and cylinder body 6 is made of aluminum, a weight reduction of 40% as a whole is obtained.

In above-mentioned actuating state of the brake booster 1, the other end of air valve 27 is contacted with reacting circular plate 42 as is generally known, whereby a reaction force proportional to the output force of the brake booster is applied to the brake pedal.

When the depressing force is released from the brake pedal, push rod 26 and air valve 27 are returned by spring 32. At first, one end 27a of air valve 27 contacts with control valve 28 and, then, control valve 28 is released from valve seat 31 so that the vacuum within chamber 18 is again transmitted to chamber 17 and each member is returned to the operational state of FIG. 1.

In the above-noted preferred embodiment of this invention, the vacuum is a power source and two chambers 17 and 18 are maintained at a vacuum state. However, a well-known construction can be also utilized for this invention as a brake booster for vehicles, for example, two chambers 17 and 18 can be maintained at atmospheric pressure, wherein compressed air is the power source.

By the foregoing, there has been disclosed a preferred form of a brake booster for vehicles constructed in accordance with the present invention. Various additions, substitutions, modifications and omissions, that do not depart from the spirit of the invention, will be appreciated.

What is claimed as new and desired to be secured by Letters Patent of the United States is:

1. A brake booster for vehicles, having a vehicle body with a brake pedal, comprising:
    a tubular housing, forming a seat portion at an input side thereof and a short sleeve portion at an output side thereof, said seat portion having an inner wall,
    a brake master cylinder coaxially adjacent to an output side of said tubular housing, and having a piston and cylinder body,
    a cylinder integrally formed with said cylinder body of said brake master cylinder, said cylinder passing through said short sleeve portion and extending to said inner wall of said seat portion within said tubular housing for attaching said tubular housing to said vehicle body,
    a seal member positioned between said cylinder and said short sleeve portion;
    a flange member positioned adjacent said inner wall of said seat portion and formed on an end portion of an outer circumference portion of said cylinder wherein said master cylinder body, said cylinder and said flange member constitute a one-piece member,
    a first movable member axially dividing a space formed on an outer circumference portion of said cylinder by said tubular housing and said cylinder and movable to said output side due to a pressure difference generated between both sides,
    a seocnd movable member slidably inserted into said cylinder and integrally movable with said first movable member and further comprising an end portion outwardly projected from said tubular housing, a valve mechanism disposed within said second movable member and actuatable by said brake pedal and regulating said pressure difference, an output member operatively connected with said first and second movable members and contacting said piston of said brake master cylinder, and means mounted on said flange for attaching said brake booster and said brake master cylinder to said vehicle body.

2. A brake booster for vehicles as set forth in claim 1 further comprising:

a plurality of openings formed in said cylinder at a predetermined distance in an inner circumferential direction of said cylinder.

3. A brake booster for vehicles as set forth in claim 2 further comprising:

a plurality of connecting members inserted within said plurality of openings, respectively, in said cylinder together with said second movable member.

4. A brake booster for vehicles, having a vehicle body with a brake pedal, comprising:

a tubular housing, forming a seat portion at an input side thereof and a short sleeve portion at an output side thereof, said seat portion having an inner wall, a brake master cylinder coaxially adjacent to said output side of said tubular housing, and having a piston and cylinder body, a cylinder integrally formed with said cylinder body of said brake master cylinder, said cylinder passing through said short sleeve portion and extending to said inner wall of said seat portion within said tubular housing for attaching said tubular housing to said vehicle body, a flange member positioned adjacent said inner wall of said seat portion and formed on an end portion of an outer circumference portion of said cylinder wherein said master cylinder body, said cylinder and said flange member constitute a one-piece member, a first movable member axially dividing a space formed on an outer circumference portion of said cylinder by said tubular housing and said cylinder and movable to said output side due to a pressure difference generated between both sides, a second movable member slidably inserted into said cylinder and integrally movable with said first movable member and further comprising an end portion outwardly projected from said tubular housing, a valve mechanism disposed within said second movable member and actuatable by said brake pedal and regulating said pressure difference, an output member operatively connected with said first and second movable members and contacting said piston of said brake master cylinder, and means mounted on said flange for attaching said brake booster and said brake master cylinder to said vehicle body wherein a plurality of openings are formed in said cylinder; and a plurality of connecting members inserted within said plurality of openings, respectively, and connecting said cylinder together with said second movable member wherein each of said plurality of connecting members further comprise a base portion slidable on an inner circumference portion of said cylinder, a plurality of flange portions mounted on opposite ends of said base portion, and a plate spring portion positioned between said opposite end portions.

5. A brake booster for vehicles as set forth in claim 1, said attaching means comprising a bolt.

6. A brake booster for vehicles as set forth in claim 1, wherein said first movable member further comprises a diaphragm having an outer rim portion secured to the housing and an inner rim portion slidably and air-tightly in contact with the outer surface of the cylinder, a shape-maintaining member contacting said diaphragm and a slide-guiding member secured to said shape-maintaining member and slidably mounted on the outer surface of said cylinder.

7. A brake booster for vehicles as set forth in claim 1, further comprising a push rod operatively connected to said brake pedal wherein said valve mechanism further comprises air-valve means connected to said push rod and further comprising a key member Positioned within said second movable member and a seal member disposed between said key member and an inner surface portion of said cylinder as well as being positioned between an inner surface portion of said cylinder and an outer surface portion of said second movable member such that key member is held in place.

* * * * *